(12) United States Patent
Cao et al.

(10) Patent No.: US 7,085,540 B2
(45) Date of Patent: Aug. 1, 2006

(54) RADIO TELECOMMUNICATIONS NETWORK, A METHOD OF TRANSMITTING DATA IN A RADIO TELECOMMUNICATIONS NETWORK, A RECEIVER, AND A METHOD OF RECEIVING

(75) Inventors: Qiang Cao, Swindon (GB); Patrick Georges Venceslas Charriere, Tetbury (GB); Seau Sian Lim, Swindon (GB); Philip Charles Sapiano, Corsham (GB)

(73) Assignee: Lucent Technologies Inc., Murray Hill, NJ (US)

( * ) Notice: Subject to any disclaimer, the term of this patent is extended or adjusted under 35 U.S.C. 154(b) by 437 days.

(21) Appl. No.: 10/410,452

(22) Filed: Apr. 9, 2003

(65) Prior Publication Data

US 2003/0199249 A1    Oct. 23, 2003

(30) Foreign Application Priority Data

Apr. 23, 2002    (EP)    ................................. 02252833

(51) Int. Cl.
*H04B 1/00*    (2006.01)
*H04L 1/00*    (2006.01)
*G08C 25/00*    (2006.01)

(52) U.S. Cl. .......................... 455/68; 455/69; 455/230; 455/266; 714/746; 714/748; 370/229

(58) Field of Classification Search ................. 455/68, 455/69, 226.1, 226.9, 230, 254, 266; 714/746, 714/748, 752, 776, 708, 51; 370/229, 465

See application file for complete search history.

(56) References Cited

U.S. PATENT DOCUMENTS

| | | | | |
|---|---|---|---|---|
| 4,692,894 A | * | 9/1987 | Bemis | .......................... 710/57 |
| 5,172,228 A | * | 12/1992 | Israelsen | ................. 375/240.22 |
| 5,497,461 A | * | 3/1996 | Matsumoto et al. | ........... 714/51 |
| 5,694,404 A | * | 12/1997 | Huang | ......................... 714/751 |
| 5,822,524 A | | 10/1998 | Chen et al. | ............. 395/200.33 |
| 5,825,761 A | * | 10/1998 | Tanaka et al. | ............... 370/333 |
| 5,828,672 A | * | 10/1998 | Labonte et al. | .............. 714/708 |
| 5,892,794 A | * | 4/1999 | Slegers | ........................ 375/219 |
| 6,088,342 A | * | 7/2000 | Cheng et al. | ................ 370/320 |
| 6,253,093 B1 | * | 6/2001 | Yoshikawa | ................... 455/557 |
| 6,273,622 B1 | * | 8/2001 | Ben-David | ................... 709/230 |
| 6,487,595 B1 | * | 11/2002 | Turunen et al. | .............. 709/226 |
| 6,493,562 B1 | * | 12/2002 | Yoshida et al. | .............. 455/517 |
| 6,661,998 B1 | * | 12/2003 | Hunzinger et al. | ............ 455/68 |
| 6,792,470 B1 | * | 9/2004 | Hakenberg et al. | .......... 709/232 |

FOREIGN PATENT DOCUMENTS

EP    1 130 839 A1    9/2001

* cited by examiner

*Primary Examiner*—Duc M. Nguyen

(57) ABSTRACT

A radio telecommunications network comprises a transmitter (2) and a receiver (4). The transmitter (2) is operative to send signals indicative of data, and the receiver (4) is operative to receive the signals (12) and decode the signals to determine the data. The receiver (4) comprises indicator means to send to the transmitter (2) an indication of whether data has been correctly determined, and the transmitter (2) is operative to retransmit at least some data not correctly determined. The receiver (4) further comprises a buffer (14) operative to store the determined data. The buffer (14) is operative to output the determined data at a predetermined rate.

9 Claims, 3 Drawing Sheets

US 7,085,540 B2

RADIO TELECOMMUNICATIONS NETWORK, A METHOD OF TRANSMITTING DATA IN A RADIO TELECOMMUNICATIONS NETWORK, A RECEIVER, AND A METHOD OF RECEIVING

CROSS REFERENCE TO RELATED APPLICATION

This application claims priority of European Application No. 02252833.5 filed on Apr. 23, 2002.

TECHNICAL FIELD

The present invention relates to a radio telecommunications network comprising a transmitter and a receiver. The present invention also relates to a method of transmitting data in a radio telecommunications network. The present invention also relates to a radio telecommunications network receiver (4) operative to receive signals indicative of data and decode the signals to determine the data. The present invention also relates to a method of receiving signals indicative of data and decoding the signals to determine the data.

BACKGROUND OF THE INVENTION

In telecommunications networks, the quality of service provided by a radio bearer (radio channel) depends on block error rate(BLER), delay, and data rate.). BLER is the measure of the ratio of the number of erroneous blocks received divided by the total number of blocks transmitted to the receiver.

In radio transmission schemes used in known mobile telecommunications networks, there are two strategies for providing a service with a low block error rate. One approach, as used in the network shown in FIG. 1, is simply to increase the power of transmitted signals (transmit power) sufficiently to increase the data reception accuracy (reliability of the radio link) up to an acceptable level. Unfortunately, the use of high transmit powers leads to an increase of the interference level which in turn leads to capacity losses. The other approach is to use a mechanism for the retransmission of the blocks that are received with an error, as shown in FIG. 2. The use of a retransmission technique leads to fluctuations in data rate. Whenever the retransmission rate increases, the end to end data rate decreases, (and vice versa). That is not acceptable for 'Streaming' services, such as video, as these require block error rate and data rate (i.e. throughput) at constant levels, although even fairly long delays in transmitting data are acceptable.

SUMMARY OF THE INVENTION

The present invention provides a radio telecommunications network comprising a transmitter and a receiver, the transmitter being operative to send signals indicative of data, the receiver being operative to receive the signals and decode the signals to determine the data, the receiver comprising indicator means to send to the transmitter an indication of whether data has been correctly determined, the transmitter being operative to retransmit at least some data not correctly determined, the receiver further comprising a buffer operative to store the determined data, the buffer being operative to output the determined data at a predetermined rate.

Advantages of the present invention in its preferred embodiments are that by using a retransmission scheme and a buffer at the receiver, high quality and constant rate service is provided, for example such as suitable for the provision of a low transmit power level streaming service over a radio channel. Low block error rate performance and constant data rate are achieved using significantly less transmit power than the known approach. This leads to a substantial gain of capacity in a cellular network. The reduced interference in consequence of lower transmit powers provides an increase in the capacity of the radio terminals also.

Preferably the buffer outputs data upon the amount of data stored in the buffer reaching a predetermined level.

Preferably the predetermined rate depends on the rate of data output from the buffer requested and/or the maximum data rate from the transmitter to the receiver and/or the fill-level of the buffer.

Preferably the receiver further comprises a controller operative to control the transmitter (2) to adjust data rate of transmission to the receiver. The controller can adjust a maximum number of data blocks of data that can be requested in a retransmission request to be retransmitted dependent upon the amount of data currently stored in the buffer. This is, for example, so as to prevent buffer overflow. In preferred embodiments an acknowledgement and retransmission mechanism coupled to a buffering and flow control scheme is thus provided.

Preferably the radio telecommunications is a Universal Mobile Telecommunications System UMTS radio telecommunications network. Preferably the receiver comprises a radio link control RLC receiver comprising an antenna operative to receive the signals and a decoder operative to determine the data blocks.

Preferably the data is data of a service requiring at least a selected data rate and less than a selected error rate so as to satisfy quality of service QoS requirements. For example services, such as 'Streaming' services, are handled in an efficient manner. For streaming services the BLER requirement is stringent(e.g BLER must be less than one in a thousand ($<10^{-3}$)), the data rate provided to the receiving application needs to be constant, but the transmission delay requirement is not very stringent.

The present invention also provides a method of transmitting data in a radio telecommunications network comprising a transmitter and a receiver, the method comprising transmitting signals indicative of data, receiving the signals and decoding the signals to determine the data, indicating to the transmitter whether data has been correctly determined, and retransmitting at least some data not correctly determined, the method further comprising storing the determined data in a buffer of the receiver, the determined data being output from the buffer at a predetermined rate.

The present invention also provides a radio telecommunications receiver operative to receive signals indicative of data and decode the signals to determine the data, the receiver comprising indicator means to send to a transmitter an indication of whether data has been correctly determined, and being operative to receive and decode signals of retransmitted data, the receiver comprises a buffer operative to store the determined data, the buffer being operative to output the determined data at a predetermined rate.

The present invention also provides a method of receiving signals indicative of data and decoding the signals to determine the data, the signals being sent in a radio telecommunications network to a receiver, the method comprising sending an indication of whether data has been correctly determined, and receiving and decoding signals of retransmitted data, the method further comprising storing the determined data in a buffer of the receiver and outputting the determined data at a predetermined rate.

BRIEF DESCRIPTION OF THE DRAWINGS

A preferred embodiment of the present invention will now be described by way of example and with reference to the drawings, in which.

DETAILED DESCRIPTION

Figure 1:
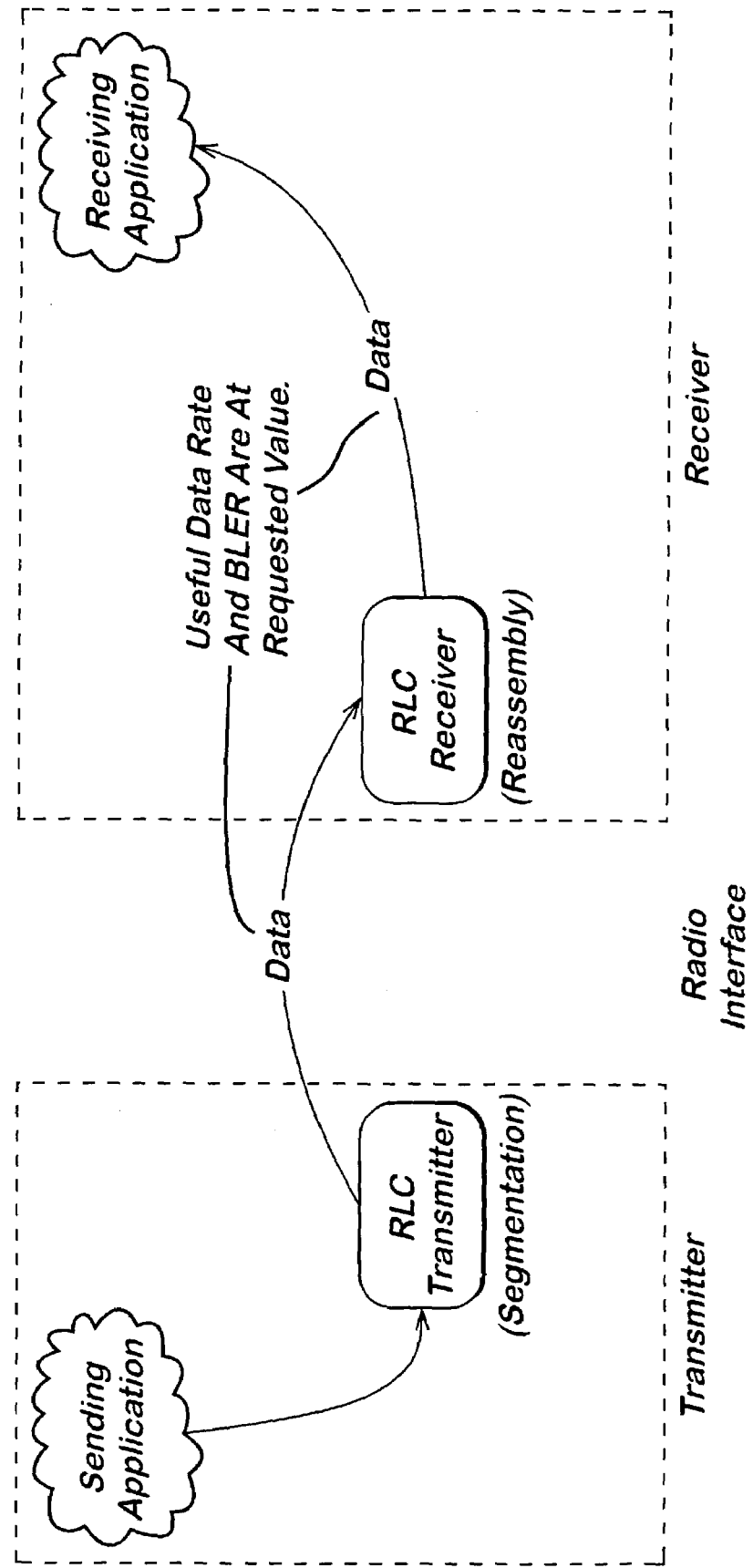
FIG. 1 is a diagram illustrating a transmitter and receiver of a first known telecommunications system (prior art)
Figure 2:
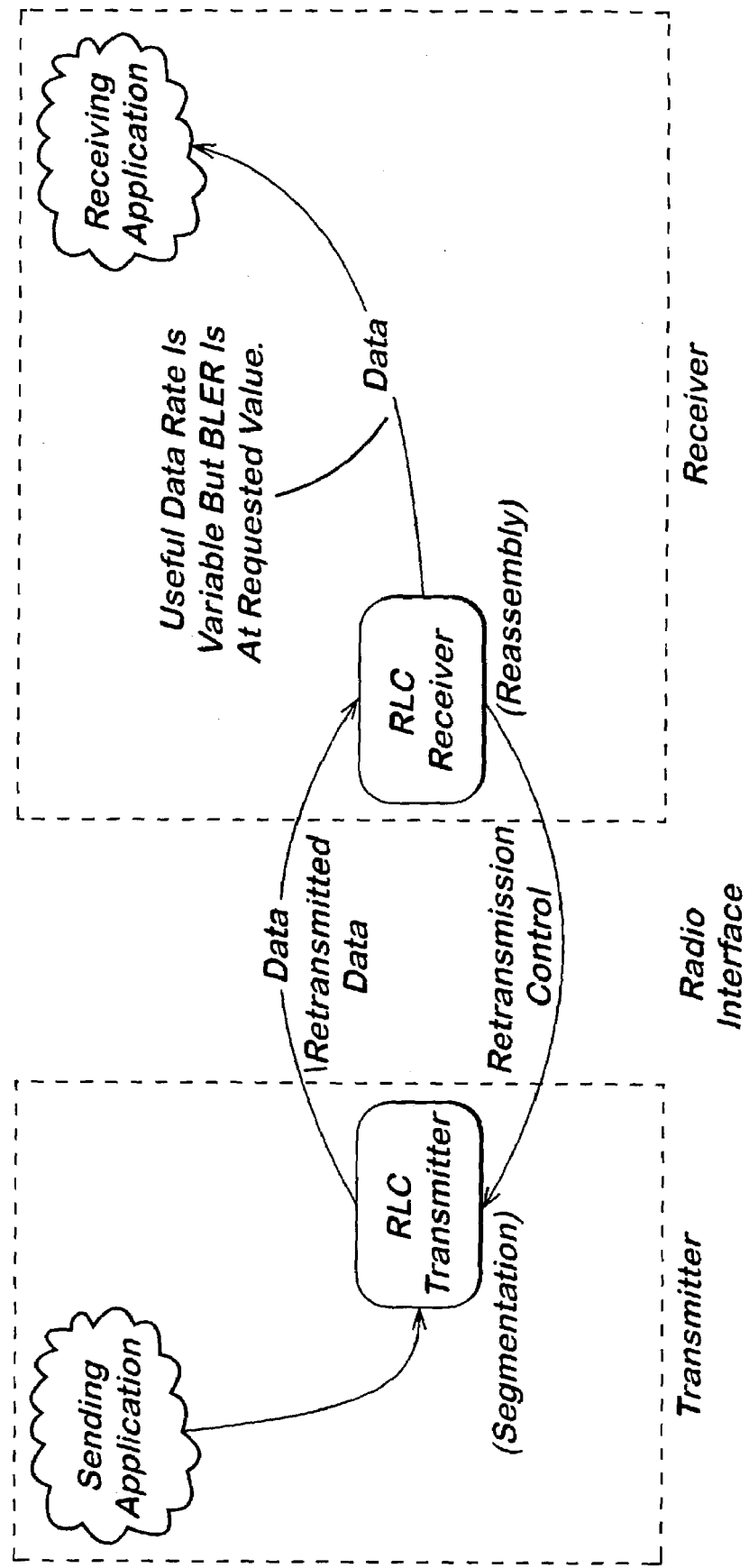
FIG. 2 is a diagram illustrating a transmitter and receiver of a second known telecommunications system (prior art)
Figure 3:
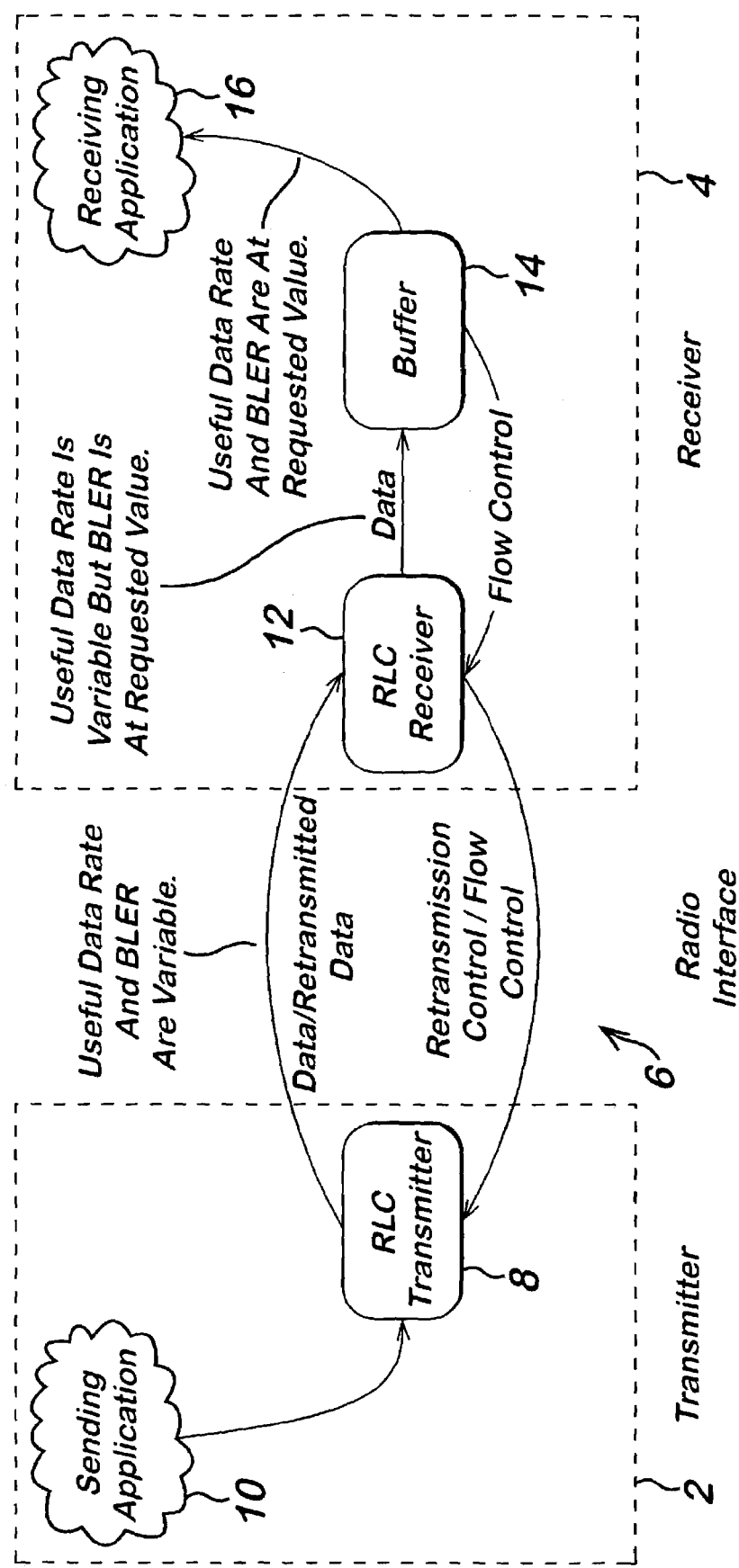
FIG. 3 is a diagram illustrating illustrating a transmitter and receiver of a telecommunications system according to a preferred embodiment.

As shown in FIG. 3, a transmitter 2 communicates with a receiver 4 by radio (denoted by radio interface 6). The transmitter 2 includes a radio link control RLC transmitter 8 which encodes and transmits as signals data provided from a sending application 10. The receiver 4 includes a radio link control RLC receiver 12 which decodes received signals to provide data to a buffer 14. The buffer provides the data to a receiving application 16.

The transmitter 2 is a base station and the receiver 4 is a mobile user terminal of a radio telecommunications network such as one in accordance with Universal Mobile Telecommunications System UMTS standards formulated by the Third Generation Partnership Project 3GPP. In an alternative embodiment (not shown) a mobile user terminal can be the transmitter and a base station, or a base station and its associated radio network controller RNC, be the receiver.

Transmission Scheme

The data rate (rate of data tranmission) over the radio interface 6 is variable but is such that its maximum value is greater than the constant rate requested by the receiving application 16. The transmitter 2 and the receiver 4 cooperate in a retransmission mechanism so as to provide a suitably low overall block error rate (i.e a high reliability of the data transmission). A suitable transmission scheme is known as acknowledge mode AM and is such that retransmission of a data packet only stops once an acknowledgement of correct receipt is received back by the transmitter 2. At the receiver 4 the correctly received data blocks are fed from the RLC receiver 12 into the buffer 14. The BLER of the data input to the buffer 14 is at an appropriately low requested level but the data rate at that point can vary. The buffer 14 acts to buffer the data so as feed the receiving application 16 at the requested data rate. As the data rate and BLER error rate are both acceptable, receiving application 16 thus gets its appropriate level of quality of service.

The buffer 14 also controls the transmission rate to the receiver 4 over the radio interface 6 in order to avoid overflow of the buffer 14. According to the retransmission mechanism, blocks to be retransmitted are indicated in a retransmission request (flow control) as a window of e.g. blocks numbered N to N+n. Overflow control is achieved for example by varying the size of this window. A controller is provided (not shown) which adjusts the window indicated in the retransmission request dependent on how full the buffer is.

Note that at the initiation of the transmission there will be a period where the buffer 14 needs to fill up a bit before starting to forward data to the receiving application 16. The minimum buffer filling level threshold (0 to 100% of the capacity of the buffer 14) is a tuneable parameter i.e set at a predetermined level. Other parameters relevant to the exact operation of the buffer 14 are the data rate requested by the receiving application 16, the size of the buffer 14, and the maximum data rate possible over the radio interface 6.

This approach is suitable for 'streaming' services, such as video, for which the BLER requirement is stringent (e.g BLER must be less than one in a thousand ($<10^{-3}$)), the data rate provided to the receiving application needs to be constant, but the transmission delay requirement is not very stringent.

The invention claimed is:

1. A radio telecommunications network comprising a transmitter and a receiver, the transmitter being operative to send signals indicative of data, the receiver being operative to receive the signals and decode the signals to determine the data, the receiver comprising indicator means to send to the transmitter an indication of whether data has been correctly determined, the transmitter being operative to retransmit at least some data not correctly determined, the receiver further comprising a buffer operative to store the determined data, the buffer being operative to output the determined data at a predetermined rate, in which the receiver further comprises a controller operative to control the transmitter to adjust data rate of transmission to the receiver, wherein the controller is operative to control the transmitter to adjust the data rate of transmission to the receiver by adjusting a maximum number of blocks of data that can be requested in a transmission request to be retransmitted dependent upon the amount of data currently stored in the buffer.

2. A radio telecommunications network according to claim 1, in which the buffer outputs data upon the amount of data stored in the buffer reaching a predetermined level.

3. A radio telecommunications network according to claim 1, in which the predetermined rate depends on the rate of data output from the buffer requested and/or the maximum data rate from the transmitter to the receiver and/or the fill-level of the buffer.

4. A radio telecommunications network according to claim 1, which is a Universal Mobile Telecommunications System UMTS radio telecommunications network.

5. A radio telecommunications network according to claim 4, in which the receiver comprises a radio link control RLC receiver comprising an antenna operative to receive the signals and a decoder operative to determine the data blocks.

6. A radio telecommunications network according to claim 1, in which the data is data of a service requiring at least a selected data rate and less than a selected error rate so as to satisfy quality of service QoS requirements.

7. A method of transmitting data in a radio telecommunications network comprising a transmitter and a receiver, the method comprising transmitting signals indicative of data, receiving the signals and decoding the signals to determine the data, indicating to the transmitter whether data has been correctly determined, and retransmitting at least some data not correctly determined; the method further comprising storing the determined data in a buffer of the receiver, the determined data being output from the buffer at a predetermined rate;

wherein the receiver further comprises a controller controlling the transmitter to adjust data rate of transmission to the receiver wherein the controller controls the transmitter to adjust the data rate of transmission to the receiver by adjusting a maximum number of blocks of data that can be requested in a retransmission request to be retransmitted upon the amount of data currently stored in the buffer.

8. A radio telecommunications receiver operative to receive signals indicative of data and decode the signals to determine the data, the receiver comprising indicator means to send to a transmitter an indication of whether data has been correctly determined, and being operative to receive and decode signals of retransmitted data, the receiver comprises a buffer operative to store the determined data, the buffer being operative to output the determined data at a predetermined rate;

wherein the receiver further comprises a controller operative to control the transmitter to adjust data rate of transmission to the receiver;

wherein the controller is operative to control the transmitter to adjust the data rate of transmission to the receiver by adjusting a maximum number of blocks of data that can be requested in a retransmission request to be retransmitted dependent upon the amount of data currently stored in the buffer.

9. A method of receiving signals indicative of data and decoding the signals to determine the data, the signals being sent in a radio telecommunications network to a receiver, the method comprising sending an indication of whether data has been correctly determined, and receiving and decoding signals of retransmitted data, the method further comprising storing the determined data in a buffer of the receiver and outputting the determined data at a predetermined rate;

wherein data rate of transmission to the receiver is adjusted by a controller in the receiver; and wherein the adjustment by the controller of the data rate of transmission to the receiver is by adjusting a maximum number of blocks of data that can be requested in a retransmission request to be retransmitted dependent upon the amount of data currently stored in the buffer.

* * * * *